Figure 1:
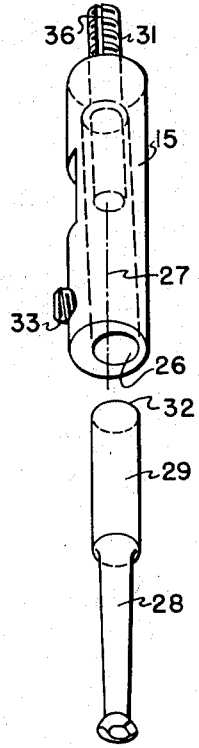

Jan. 10, 1956  M. PETERMAN  2,729,991
PRE-SET BORING TOOL
Filed March 24, 1955  2 Sheets-Sheet 1

Inventor
MAX PETERMAN
By *Harry Sommers* Attorney

Jan. 10, 1956    M. PETERMAN    2,729,991
PRE-SET BORING TOOL
Filed March 24, 1955    2 Sheets-Sheet 2

Inventor
MAX PETERMAN
By _____ Attorney

United States Patent Office 2,729,991
Patented Jan. 10, 1956

2,729,991

PRE-SET BORING TOOL

Max Peterman, West Orange, N. J.

Application March 24, 1955, Serial No. 496,416

1 Claim. (Cl. 77—58)

This invention relates to boring tools, and more particularly to a boring tool especially adapted for use in finishing a hole to precise diameter. The boring tool of the invention may be inserted into the collet or other rotating holder of a machine, such as, for example, a jig borer, milling machine lathe, etc. and, when once set, will cut the diameters of holes for which it has been set repeatedly and uniformly, without requiring any further adjustment. A set of boring tools made according to the invention may be preset to cut the most commonly used holes.

Pursuant to the invention, a great saving of time in boring holes of different diameters is effected as the worker may rapidly insert a different preset boring tool of the invention (in a set of such tools) for different sized holes requiring but a few seconds to do so, and attaining thereby accurate, preset results. The conventional method of using a boring head requires several cut-and-try adjustments for each different sized hole, and involves a fair risk of cutting the holes oversize on the final adjustment.

Pursuant to the invention, there is no overhang of the tool in the boring head, thus making for greater rigidity and less chatter. It is also possible, with the tool of the invention, to bore closer to a projection in the work that is not possible with conventional boring heads because of their size and clumsiness.

The preset tool of this invention provides no obstruction to the work and obviates the danger of striking projections in the work.

These and other advantageous objects, which will appear from the drawings and from the description hereinafter, are accomplished by the structure of my invention, of which an embodiment is illustrated in the drawings. It will be apparent, from a consideration of said drawings and the following description, that the invention may be embodied in other forms suggested thereby, and such other forms as come within the scope of the appended claim are to be considered within the scope and purview of the instant invention.

Figure 2:
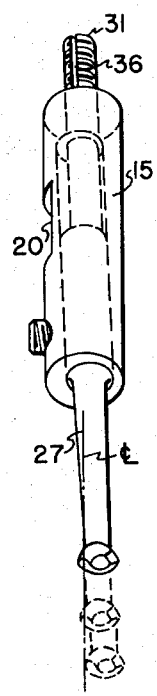
Figure 3:
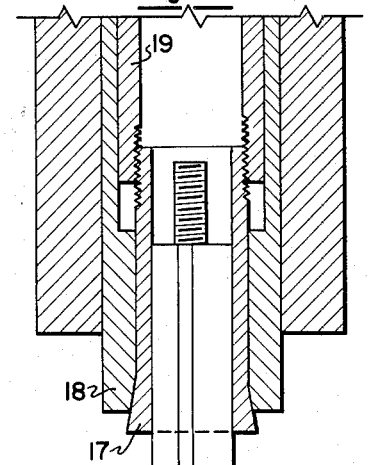
Figure 4:
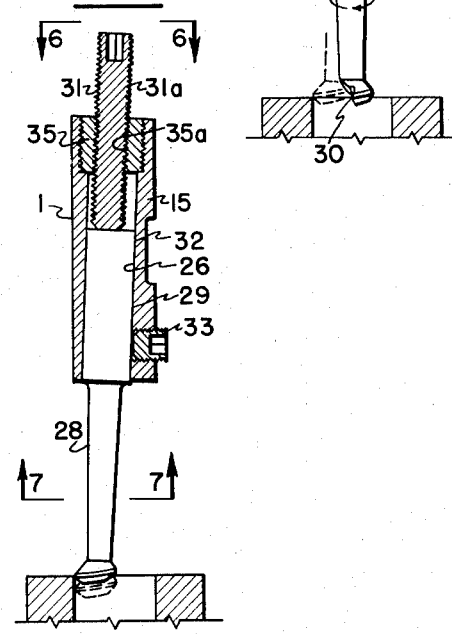
Figure 5:
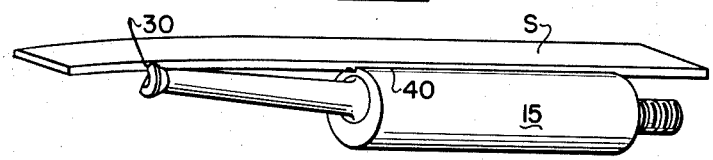
Figure 6:
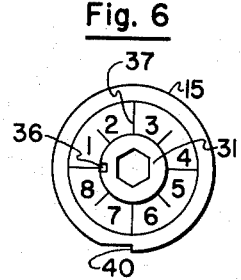
Figure 7:
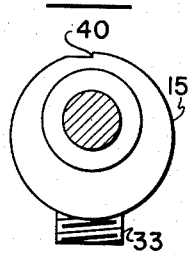
Figure 8:
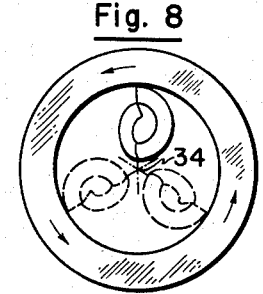

In the drawings:

Fig. 1 is a perspective view of a preset boring tool sleeve and boring bar embodying the invention, shown disconnected, Fig. 2 is a similar view, showing the parts connected for normal operation, Fig. 3 is a vertical, partly sectional view, of a rotating holder and the boring tool of the invention, positioned therein for finishing a hole in a piece of work, the latter being shown fragmentarily and sectionally at the bottom of Fig. 3, Fig. 4 is a vertical sectional view of the boring tool, Fig. 5 is a perspective view showing the manner in which a straight edge is placed against an edge marked longitudinally on the sleeve of the tool of the invention, the boring bar being rotated so that its cutting end is also aligned with the straight edge, thereby assuring the boring bar being on dead-center, Fig. 6 is an enlarged plan view taken on line 6—6 of Fig. 4, Fig. 7 is a transverse sectional view taken on line 7—7 of Fig. 4, and Fig. 8 is a schematic view, showing the manner in which the boring end of the boring bar constantly constantly contacts the edge of the inner wall which defines the hole to be finished in the work and indicating, in dotted lines, positions of the boring end of the tool on rotation in the direction of the arrows, continuously boring the opening in the work.

As shown in the drawings, the boring tool of the invention comprises an elongated sleeve 15 to be secured in the holder 16 of a jig borer, milling machine lathe, etc. wherein the holder 16 is rotated by any suitable motor or other means (not shown). To facilitate securing the sleeve 15 in the holder, a collet 17 may be provided, engaged by the internally threaded tube 19 of the holder 16. The collet 17 may be of any desired or convenient form, such as a split collet compressed about the sleeve to hold it in the holder 16, or the collet might have a set screw to be tightened against a flat surface, such as 20 of the sleeve 15.

The sleeve 15 is provided with an aperture or bore 26 longitudinally disposed therethrough at an angle to the longitudinal axis 27 thereof. An elongated boring bar 28 is provided, externally conformed as at 29 to the sleeve aperture 26 so that it may be slidably disposed therein. The lower end of said bar is formed as a cutting end 30, the parts being so proportioned that said cutting end will extend from the lower end of the sleeve when the bar is positioned in the sleeve (Fig. 2). An adjusting member or screw 31 is provided for engagement with the upper end 32 of the bar 28 (Fig. 4). On movement of adjusting bar 31 in the sleeve 15 and against the upper end 32 of the boring bar 28, the latter is moved downwardly in the sleeve, carrying the cutting end 30 of the boring bar downwardly relative to the center line 27 of sleeve 15 as indicated by the dotted lines in Figs. 2 and 8. Thus one basic boring tool is adapted for a range of adjustment attainable by movement of adjusting member 31 in the sleeve 15 as above set forth. By way of example, let us suppose that the aperture 26 in the sleeve is drilled 2° 52′ off the axis 27 of the sleeve. At that angle, when the boring bar 28 is moved .020 inch in its sleeve (with the parts proportioned approximately as shown in the original drawings of this application), the cutting end 30 thereof will move .001 inch in radius; its radial movement will be at the ratio of twenty to one relative to axial movement of adjusting member 31 in the sleeve. Therefore, a coarse adjustment in length of the adjusting member would provide a very fine adjustment in radius, permitting adjusting the tool for boring holes to a great degree of accuracy.

Means are preferably provided for locking the boring bar in predetermined position of adjustment. Said means may comprise, as shown in the drawings, complementary means engaging the sleeve and boring bar, such as a set screw 33 threaded into the sleeve (Figs. 1 and 5) and engaging the boring bar 28.

Complementary means are provided for axial movement of the adjusting member 31 in the sleeve 15 and against the upper end 32 of the boring bar 28, such as a collar 35 secured to and within the upper end of the sleeve, partially closing the sleeve at that end. Complementary means are provided on the collar and adjusting member for attaining such axial movement of the adjusting member 31 in the sleeve, as, for example, (Fig. 4) complementary threads 31a and 35a on adjusting member 31 and collar 35.

Complementary markings may be provided on the adjusting member and collar for measuring the extent of movement of the adjusting member in the collar and against the bar, as for example, a longitudinal slot or line 36 impressed or cut into the adjusting member 31 so that on rotation of said adjusting member, said slot will be moved into alignment with markings 37 (Fig. 6) for example, on the collar 35. An edge 40 may be marked (Figs. 5 and 7) externally longitudinally on the sleeve at the dead-center thereof or cut thereinto so that a straight edge S, Fig. 5, may be placed along said edge 40 and the boring bar rotated so that its cutting end 30 will be aligned with the straight edge, thereby assuring the boring bar being on dead center before tightening of the set screw 33.

Having thus described my invention, what I claim as new and desire to secure by Letters Patent is:

An adjustable boring tool adapted for interchangeable insertion in the socket of a rotary holder, said tool comprising an elongated sleeve adapted for ready insertion and retention in the socket of said holder, said sleeve having a longitudinal bore extending therethrough at an axial angle relative to the axis of the sleeve, an elongated boring bar formed with a shank fitted for insertion into said bore, said bar being provided with a cutter on the outer extremity thereof, an adjusting screw threaded into the end of the sleeve remote from the boring bar, and adapted to form an adjustable stop for the inner extremity of the bar, an indicating dial disposed on the extremity of the sleeve within the confines of the periphery thereof, a longitudinal mark on said adjusting screw to register with the indications of said dial for determining the longitudinal adjustment of the boring bar, and means for fixedly retaining said boring bar in adjusted position to said sleeve.

References Cited in the file of this patent

UNITED STATES PATENTS

| Re. 14,122 | Winningham | Apr. 25, 1916 |
| 521,922 | Stevenson | June 26, 1894 |
| 2,274,244 | Miller | Feb. 24, 1942 |